Figure 1:
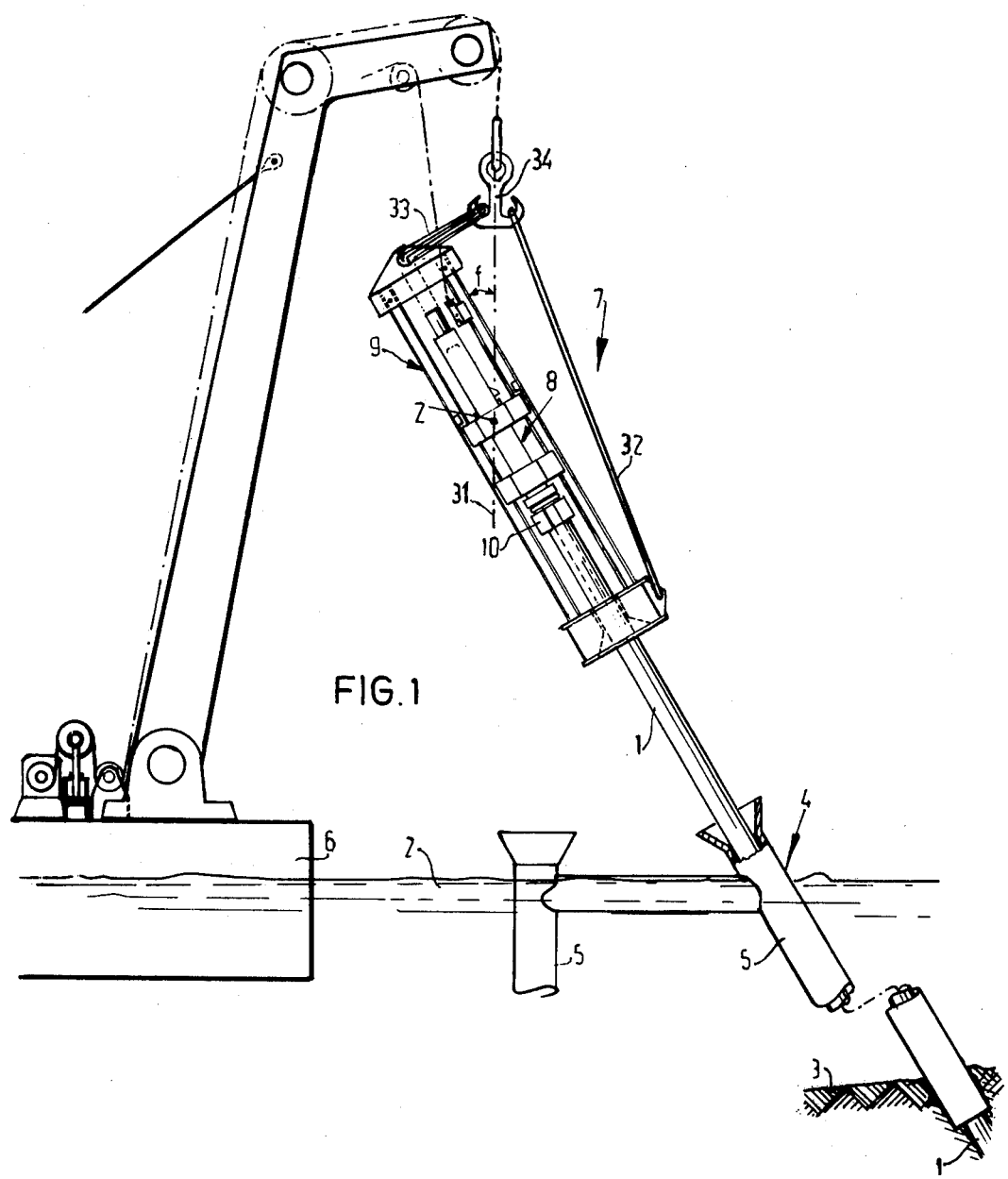

United States Patent [19]

Schnell

[11] 4,067,401
[45] Jan. 10, 1978

[54] PILE-DRIVING HAMMER

[75] Inventor: Hans Günther Schnell, Hamburg, Germany

[73] Assignee: Van Kooten, B.V., Naarden, Netherlands

[21] Appl. No.: 677,925

[22] Filed: Apr. 19, 1976

[30] Foreign Application Priority Data

Apr. 11, 1975 Netherlands .......................... 7504371

[51] Int. Cl.² .............................................. B25D 9/00
[52] U.S. Cl. ..................................... 173/135; 92/153; 92/160
[58] Field of Search ................... 173/135; 92/153, 155, 92/159, 160; 184/6.8, 6.7, 6.14

[56] References Cited

U.S. PATENT DOCUMENTS

| 1,689,752 | 10/1928 | Rushmore | 184/6.8 |
| 1,751,906 | 3/1930 | Clark | 92/155 |
| 2,085,976 | 7/1937 | Heintz | 92/153 |
| 2,166,857 | 7/1939 | Bugatti | 92/153 |
| 2,907,304 | 10/1959 | Macks | 92/153 |
| 3,106,138 | 10/1963 | Thoma | 92/160 |
| 3,521,531 | 7/1970 | Kaesemodel | 92/160 |

Primary Examiner—Robert A. Hafer
Attorney, Agent, or Firm—Lewis H. Eslinger

[57] ABSTRACT

A pile-driving hammer comprises a hammer cylinder, a piston accomodated in said hammer cylinder in sealing relationship with a sliding face of the hammer cylinder and means for supplying lubricant to said sliding face which consists of a lining of wear-resistant material.

The pile driving hammer has a long lifetime, since cavities are provided in the lining distributed along the surface of the sliding face. In this hammer the lubricant is retained in the cavities.

7 Claims, 8 Drawing Figures

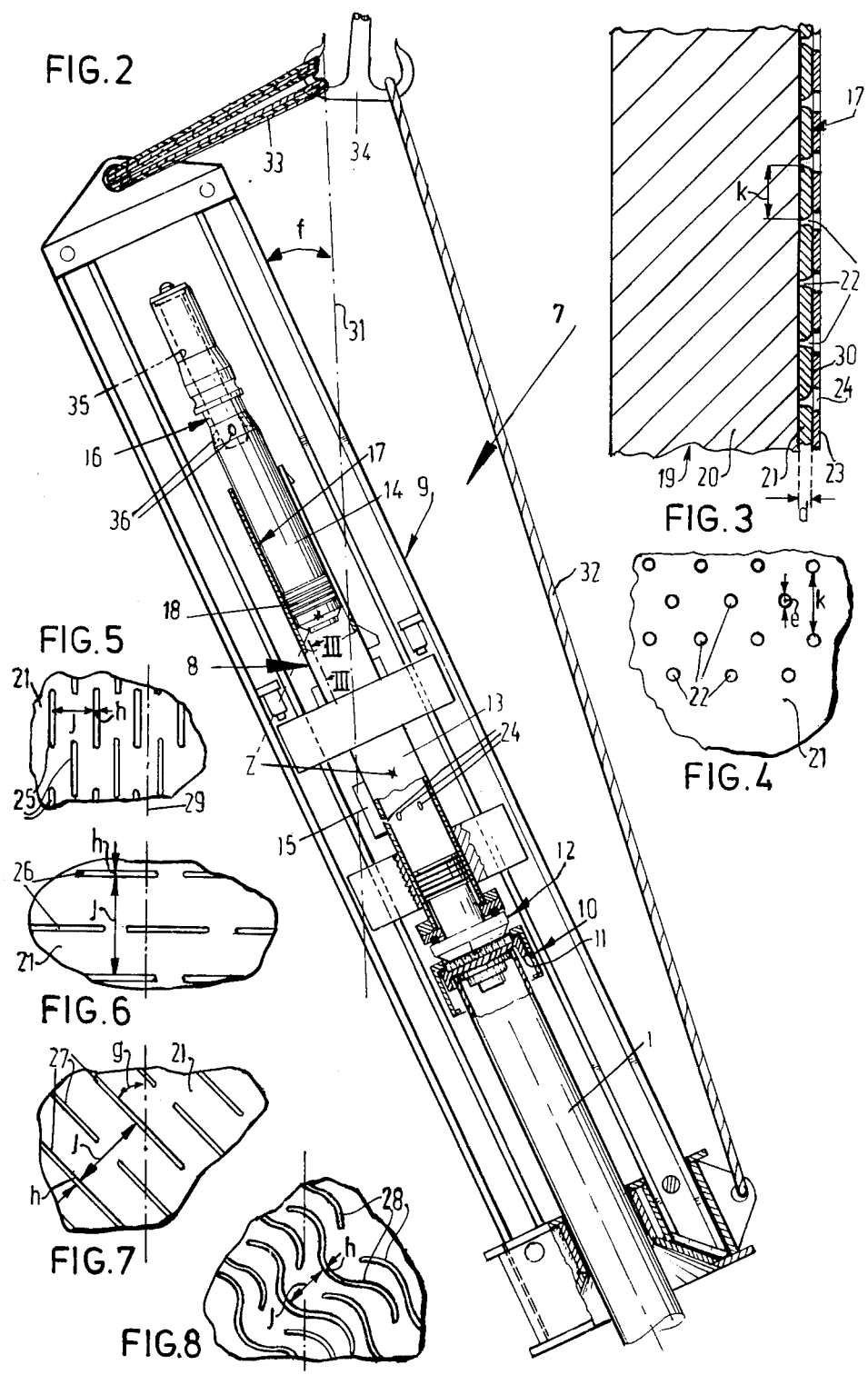

PILE-DRIVING HAMMER

The invention relates to a pile-driving hammer comprising a hammer cylinder, a piston accomodated in said hammer cylinder in sealing relationship with a sliding face of the hammer cylinder and means for supplying lubricant to said sliding face, which consists of a lining of wear-resistant material.

Pile-driving hammers of the kind set forth are known. The lining is formed therein by a porous chromium layer. The pores of the chromium layer are filled after some time with material worn off the sliding face in the form of very small particles, so that the sliding face obtains so great a smoothness that practically immediately after the application the lubricant drips off the sliding face. The lack of adequate lubricant on the sliding face and the resultant high amoutn of wear shorten the lifetime of the known hammer, particularly when the hammer has to drive piles into the ground at a large rake angle.

The invention provides a pile-driving hammer having a long lifetime, since cavities are provided in the lining distributed along the surface of the sliding face. In this hammer the lubricant is retained in the cavities.

In a further embodiment of the pile-driving hammer in accordance with the invention the cavities have the shape of slots. In this case the slot-shaped cavities are cleaned by the flowing lubricant. Thus any material worn off and collected in the cavities is rinsed away.

Preferably the slot-shaped cavities are disposed in a direction inclined to the axial direction of the hammer cylinder. Thus the lubricant is guided along a long path past the sliding face so that it is utilized very effectively.

The invention will be described hereinafter with reference to a drawing in which:

FIG. 1 is a schematic survey of the pile-driving operation by means of a pile-driving device comprising a hammer in accordance with the invention, FIG. 2 is an enlarged side elevation partly broken away of the driving hammer shown in FIG. 1, FIG. 3 is an enlarged sectional view of the cylinder wall taken on the line III—III in FIG. 2 during the formation of cavities in the lining of the hammer cylinder, FIG. 4 is an elevational view of part of the ready lining of FIG. 3 and FIGS. 5,6,7 and 8 are elevational views corresponding with that of FIG. 4 of further variants.

Before a pile 1 is driven into a ground 3 under the water 2, first a setting frame 4 is disposed on the ground 3, said frame having guide tubes 5, which determine the location and the direction of the pile 1 to be driven. By means of a floating derrick 6 a pile-driving device 7 is arranged on the pile 1.

The pile-driving device 7 comprises a driving hammer 8, a guide frame 9 for guiding said hammer 8 and a pile cap guide 10 bearing on a driving cap 11. The driving hammer 8 shown in FIGS. 1 and 2 is formed by a known Diesel hammer comprising a hammer cylinder 13, a heavy piston 14 accomodated in the hammer cylinder 13, an impact piece 12 sealed to the hammer cylinder 13 and adapted to slide, a fuel pump 15 and means 16 for supplying lubricant, for example oil, to the sliding face 17 of the hammer cylinder 13, along which the piston 14 is adapted to slide up and down in sealed relationship by means of piston rings 18. Specifically because the pile-driving device 7 is suspended to a hook 34 by means of cables 32 and 33 at an angle of inclination $f$ to the vertical plane 31, the piston 14 bears on the sliding face 17 with a heavy normally directed force.

Although the invention is of particular importance for a Diesel hammer, it may as well be applied to a steam hammer, a hydraulic or a pneumatic hammer.

FIG. 3 shows a fraction of a cylinder wall 19. A lining 21 of chromium, cadmium or another, wear-resistant material or a wear-resistant alloy is galvanically applied to the steel 20, whilst the inner surface 30 of hammer cylinder 13 is uncovered. The thickness $d$ of the layer may be of the order of 0.2 to 0.5 mm. Subsequently open cavities 22 are formed in the lining 21 also by galvanic agency, but now with inverted poles, whilst the sliding 17 is covered with a foil 23 in which round holes 24 are provided, the diameter $e$ thereof being, for example, of the order of 0.5 to 3 mms, the relative distance $k$ being, for example, of the order of 5 to 20 mms. The holes 24 can be readily made in the foil 23. FIGS. 5 to 8 show other shapes of the cavities 25,26,27 and 28 respectively by using a different foil with a different hole pattern, stuck to the lining 21, the wear-resistant material being subsequently removed galvanically at the location of the holes.

FIG. 5 shows vertical slot-shaped cavities 25 in the lining 21, but said cavities may extend parallel to the axial direction 29. Thus impurities can be more readily flushed out of the cavities 25.

As shown in FIG. 6, the slot-shaped cavities 26 may be horizontal or at right angles to the axial direction 29 of the hammer cylinder 13 so that the lubricant is better retained in the cavities 26.

As shown in FIG. 7, the cavities 27 are preferably orientated at an angle of inclination $g$ to the axial direction 29 of the hammer cylinder 13 so that these cavities 27 are thoroughly flushed and, moreover, the lubricant is long retained on the lining 21. The lubricant is guided on a step-shaped helical path along the cylindrical lining 21.

As shown in FIG. 8, the cavities 28 may have a curved shape of the slot.

Any other pattern of cavities may be employed. The cavities 25,26,27 and 28 may have a width $h$ of the order of 1 to 3 mms. The relative distance $j$ may be of the order of 1 to 5 cms.

The lubricant supply 16 may be formed by a lubricant pump spraying at every stroke the lubricant against the cylinder wall 19 at the top end of the hammer cylinder 13. As shown in FIG. 2 the lubricant supply 16 is formed by a reservoir 35 in the top end of the piston 14. The reservoir 35 has channels 36 distributed along its circumference, from which is leaking lubricant which arrives at the sliding face 17, where it is retained by the cavities 22,25,26,27 or 28.

With a smaller size and a smaller interval between the cavities 24,25,26,27 and 28 as stated above the retainment of the lubricant is still further improved.

The diameter $e$ of the holes 24 of FIG. 3 lies between 0.2 and 0.5 mm, the relative distance $k$ being 0.5 to 2 mms. Accordingly the width $h$ of the cavities 25,26,27 and 28 preferably lies between 0.5 and 1 mm, the relative distance $j$ being 2 to 4 mms respectively.

What I claim is:

1. A pile-driving hammer comprising a hammer cylinder having an inner sliding face, a piston received within said hammer cylinder in sealing relationship with said sliding face of the hammer cylinder and means for supplying a lubricant to said sliding face comprising a lining formed of wear-resistant material on said sliding face of the hammer cylinder having a plurality of recessed cavities formed therein distributed along the surface of said sliding face.

2. A pile-driving hammer as claimed in claim 1 wherein said cavities have the shape of elongated slots.

3. A pile-driving hammer as claimed in claim 1 wherein said cavities have the shape of elongated slots oriented at an angle of inclination to the axial direction of the hammer cylinder.

4. A pile driving hammer as claimed in claim 1 including a guide frame for guiding the hammer and means for suspending said guide frame at an angle of inclination to a vertical plane.

5. A pile driving hammer as claimed in claim 1 wherein said cylinder is a steel body and sliding face of the hammer cylinder comprises a surface lining galvanically applied to said steel body.

6. A pile driving hammer as claimed in claim 5 wherein said lining is formed of chromium.

7. A pile driving hammer as claimed in claim 5 wherein said lining is formed of cadmium.

8. A pile driving hammer as claimed in claim 1 wherein said hammer is of the diesel type; said hammer cylinder has an open top end; and said piston includes an oil reservoir at its top end; said oil reservoir communicating through at least one channel with said sliding face of said hammer cylinder.

9. The method of treating the sliding face of a hammer cylinder in a pile driving hammer which comprises the steps of placing a lining on said hammer cylinder; galvanically removing lining material from the lining of said cylinder to form cavities therein, and covering said lining with a cover layer having apertures therein located in alignment with the cavities in the lining whereby said cavities and holes will distribute lubricating fluid along said cylinder and a piston received therein.

* * * * *